(12) United States Patent
Mesiwala et al.

(10) Patent No.: US 12,490,040 B2
(45) Date of Patent: Dec. 2, 2025

(54) DIRECTION OF AUDIO ARRIVAL FROM AMBISONICS CHANNELS USING AZIMUTH AND ELEVATION SEGMENTS

(71) Applicant: GoPro, Inc., San Mateo, CA (US)

(72) Inventors: Hakim Mesiwala, Cupertino, CA (US); Eric Steven Penrod, Brentwood, CA (US); Erich Tisch, San Francisco, CA (US); Mark Hardin, Santa Rosa, CA (US); Timothy Dick, San Francisco, CA (US); William Edward MacDonald, Oceanside, CA (US)

(73) Assignee: GoPro, Inc., San Mateo, CA (US)

( * ) Notice: Subject to any disclaimer, the term of this patent is extended or adjusted under 35 U.S.C. 154(b) by 219 days.

(21) Appl. No.: 18/204,630

(22) Filed: Jun. 1, 2023

(65) Prior Publication Data
US 2024/0406652 A1    Dec. 5, 2024

(51) Int. Cl.
*H04S 7/00* (2006.01)
*H04R 1/02* (2006.01)
(Continued)

(52) U.S. Cl.
CPC .............. *H04S 7/30* (2013.01); *H04R 1/028* (2013.01); *H04R 3/005* (2013.01); *H04R 5/027* (2013.01);
(Continued)

(58) Field of Classification Search
CPC ........ H04S 7/30; H04S 3/008; H04S 2400/01; H04S 2400/15; H04S 2420/11;
(Continued)

(56) References Cited

U.S. PATENT DOCUMENTS

| 9,769,588 | B2 * | 9/2017 | Shenoy | H04R 3/005 |
| 2020/0154229 | A1 * | 5/2020 | Habets | H04S 7/303 |
| 2020/0275227 | A1 * | 8/2020 | Habets | H04R 3/005 |

FOREIGN PATENT DOCUMENTS

WO    WO-2022108494 A1 *   5/2022    ............... H04S 7/00

OTHER PUBLICATIONS

Khaddour, Hasan, Jiri Schimmel, and Michal Trzos. "Estimation of direction of arrival of multiple sound sources in 3d space using b-format." International Journal of Advances in Telecommunications, Electrotechnics, Signals and Systems 2.2 (2013): 63-67.

\* cited by examiner

*Primary Examiner* — William A Jerez Lora
(74) *Attorney, Agent, or Firm* — Young Basile Hanlon & MacFarlane, P.C.

(57) ABSTRACT

Devices and methods for determining a direction of audio arrival from Ambisonics channels using azimuth and elevation segments is described herein. A method includes generating multiple blocks of samples from Ambisonics signals for a time interval, determining an azimuth angle estimate and an elevation angle estimate for the time interval when a defined number of blocks in the multiple blocks of samples are valid, generating the azimuth angle estimate based on maximum number of azimuth angle estimates present in an azimuth segment amongst a defined number of azimuth segments, and generating the elevation angle estimates based on maximum number of elevation angle estimates present in an elevation segment amongst a defined number of elevation segments, where the direction of arrival of the Ambisonics signals is based on the azimuth angle estimate and the elevation angle estimate.

20 Claims, 14 Drawing Sheets

(51) Int. Cl.
*H04R 3/00* (2006.01)
*H04R 5/027* (2006.01)
*H04S 3/00* (2006.01)

(52) U.S. Cl.
CPC .......... *H04S 3/008* (2013.01); *H04R 2499/11* (2013.01); *H04S 2400/01* (2013.01); *H04S 2400/15* (2013.01); *H04S 2420/11* (2013.01)

(58) Field of Classification Search
CPC ........ H04R 1/028; H04R 3/005; H04R 5/027; H04R 2499/11
USPC ................................................ 381/1, 56, 58
See application file for complete search history.

DIRECTION OF AUDIO ARRIVAL FROM AMBISONICS CHANNELS USING AZIMUTH AND ELEVATION SEGMENTS

TECHNICAL FIELD

This disclosure relates to determining direction of arrival of audio from a spherical image capture device using Ambisonics channels.

BACKGROUND

Dual-lens image capture devices are used to simultaneously record a scene from a first-person perspective using a forward-facing lens and of the user using a rear-facing lens. Images from the dual lenses may be stitched together to create a spherical image. Typically, one audio stream is recorded. The audio may be sufficient for the forward-facing lens, however it may be insufficient for the rear-facing lens, for example when the user is narrating the scene being captured.

SUMMARY

Disclosed herein are implementations of an image capture device and methods for determining direction of arrival of audio using Ambisonics channels.

In an aspect, a method includes generating multiple blocks of samples from Ambisonics signals for a time interval, determining an azimuth angle estimate and an elevation angle estimate for the time interval when a defined number of blocks in the multiple blocks of samples are valid, generating the azimuth angle estimate based on highest number of azimuth angle estimates present in an azimuth segment amongst a defined number of azimuth segments, and generating the elevation angle estimate based on highest number of elevation angle estimates present in an elevation segment amongst a defined number of elevation segments, where the direction of arrival of the Ambisonics signals is based on the azimuth angle estimate and the elevation angle estimate.

In another aspect, an image capture device includes a plurality of microphones and a processor configured to receive Ambisonics signals for a time interval from the plurality of microphones. The processor is further configured to divide the time interval into a plurality of blocks, determine an azimuth angle estimate and an elevation angle estimate for the time interval when a subset of blocks in the plurality of blocks are valid, identify the azimuth angle estimate based on a maximum number of azimuth angle estimates present in an azimuth segment from a plurality of azimuth segments, and identify the elevation angle estimate based on a maximum number of elevation angle estimates present in an elevation segment from a plurality of elevation segments, where a direction of arrival of the Ambisonics signals is based on the azimuth angle estimate and the elevation angle estimate.

In yet another aspect, a method includes determining a direction of arrival of Ambisonics signals for a time interval when a defined number of blocks in the time interval are valid. The determining further comprising determining an azimuth angle estimate and an elevation angle estimate for the time interval, generating the azimuth angle estimate based on a maximum number of azimuth angle estimates present in an azimuth segment from a number of azimuth segments defining an azimuth space, and generating the elevation angle estimate based a maximum number of elevation angle estimates present in an elevation segment from a number of elevation segments defining an elevation space. The direction of arrival is represented by the azimuth angle estimate and the elevation angle estimate.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
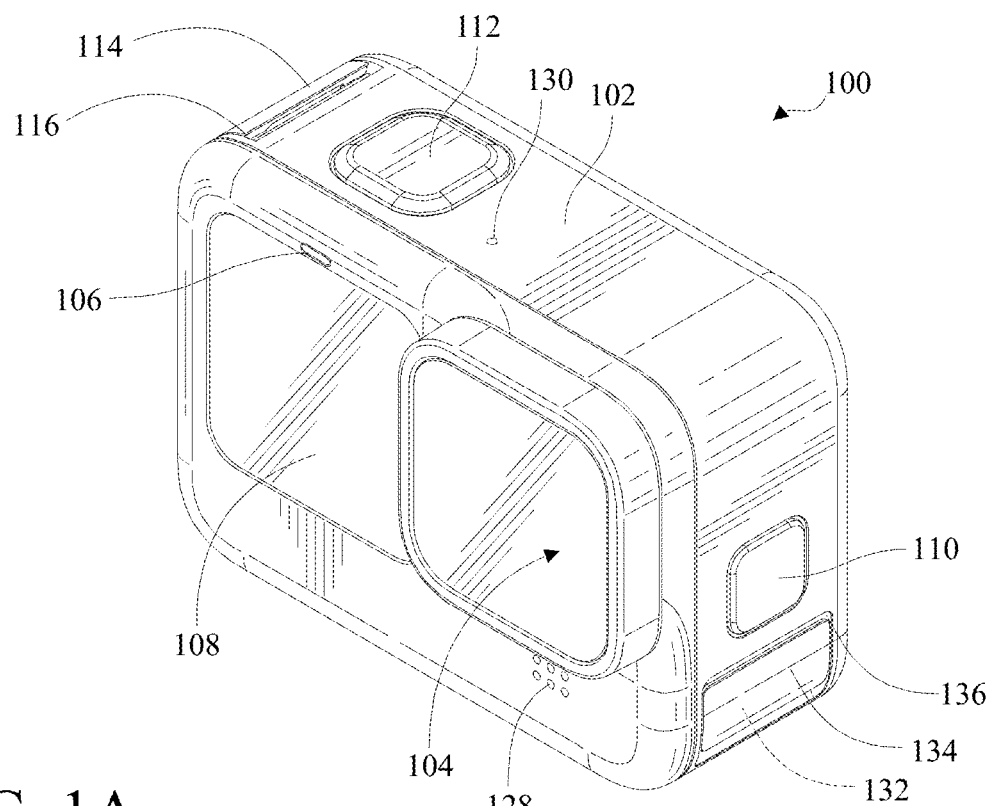
FIGS. 1A-B are isometric views of an example of an image capture apparatus.

In the implementations described herein, dual-lens image capture devices include microphones placed to support audio field of view, Ambisonics creation, 360-degree direction of arrival estimation, direction of audio arrival (DOAA) estimation, wind noise reduction, and water drainage. The DOAA estimation may enable applications running on the dual-lens image capture devices to orient on a sound source or shift between two sound sources. In an example, the application may shift between an interviewee and interviewer during an interview.

In the implementations described herein, methods of estimating the DOAA from Ambisonics channels or signals use a defined number of azimuth segments to cover an azimuth plane of 360° and a defined number of elevation segments to cover an elevation space of −90° to +90° to estimate the DOAA. The Ambisonics signals are either captured or generated from captured audio signals. The method processes a defined number of blocks or frames in a defined interval of time. Each block may include a defined number of samples of the Ambisonics signals. For a block, the defined number of samples plus a previous defined number of samples are transformed into a defined number of frequency domain bins of spectral values, i.e., where a spectral value is a representation of the energy level in a frequency domain bin. A subset of the defined number of frequency domain bins (i.e., valid bins) is processed to determine whether a block is suitable for azimuth and elevation angle calculations. That is, a spectral or energy analysis is performed in each frequency domain bin of the valid frequency domain bins. For a valid or error-free block, the azimuth and elevation angles are estimated and recorded with respect to an azimuth segment and an elevation segment, respectively. If azimuth and elevation angles have been estimated and recorded for a defined number of error-free blocks from the defined number of blocks, then the azimuth segment with the most estimated azimuth angles is determined. The estimated azimuth angles in this azimuth segment are averaged to determine an estimated azimuth angle for the defined interval of time. This is repeated for the elevation segment with the most estimated elevation angles to determine an estimated elevation angle for the defined interval of time. That is, this angle pair is the estimate a DOAA for the defined interval of time.

In the implementations described herein, confidence levels for each of the estimated azimuth angle and the estimated elevation angle are determined based on the percentage of angles in the selected segment with respect to the total number of angles collected. In the implementations described herein, an indexing process may be used to determine that the estimated azimuth angle and the estimated elevation angle are from a same block to ensure that the estimated azimuth angle and the estimated elevation angle were estimated for a same time instant.

In the implementations described herein, the methods for DOAA estimation may run or execute on the dual-lens image capture devices, mobile applications, and desktop applications. That is, the methods for DOAA estimation are applicable to both on-camera and off-camera applications. For the off-camera applications, user specified options of rotation, including but not limited to, stabilization, world-lock, and horizon leveling, are first applied to the Ambisonics channels prior to using the DOAA estimation method. That is, the rotation options or parameters are applied to the Ambisonics channels when the DOAA estimation method is performed separately or remotely from the image capture devices or cameras. For the on-camera applications, the Ambisonics channels are used directly for estimating the DOAA. That is, the rotation options or parameters are not applied (e.g., forego application) to the Ambisonics channels when the DOAA estimation method is performed on the image capture devices or cameras.

Figure 1B:
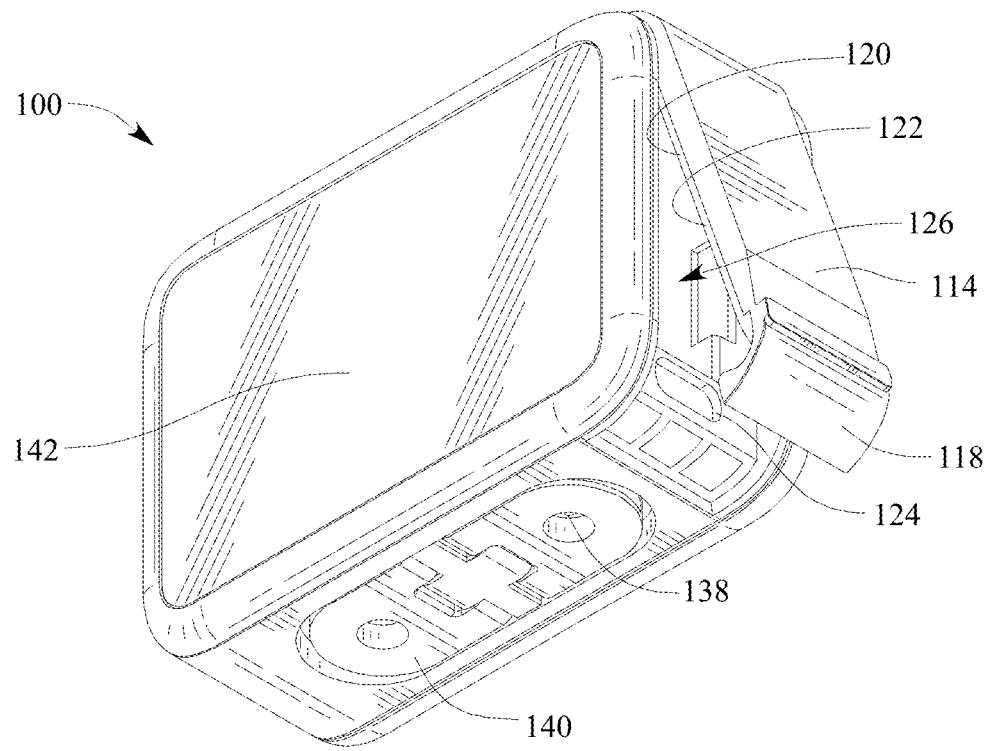
Figure 5:
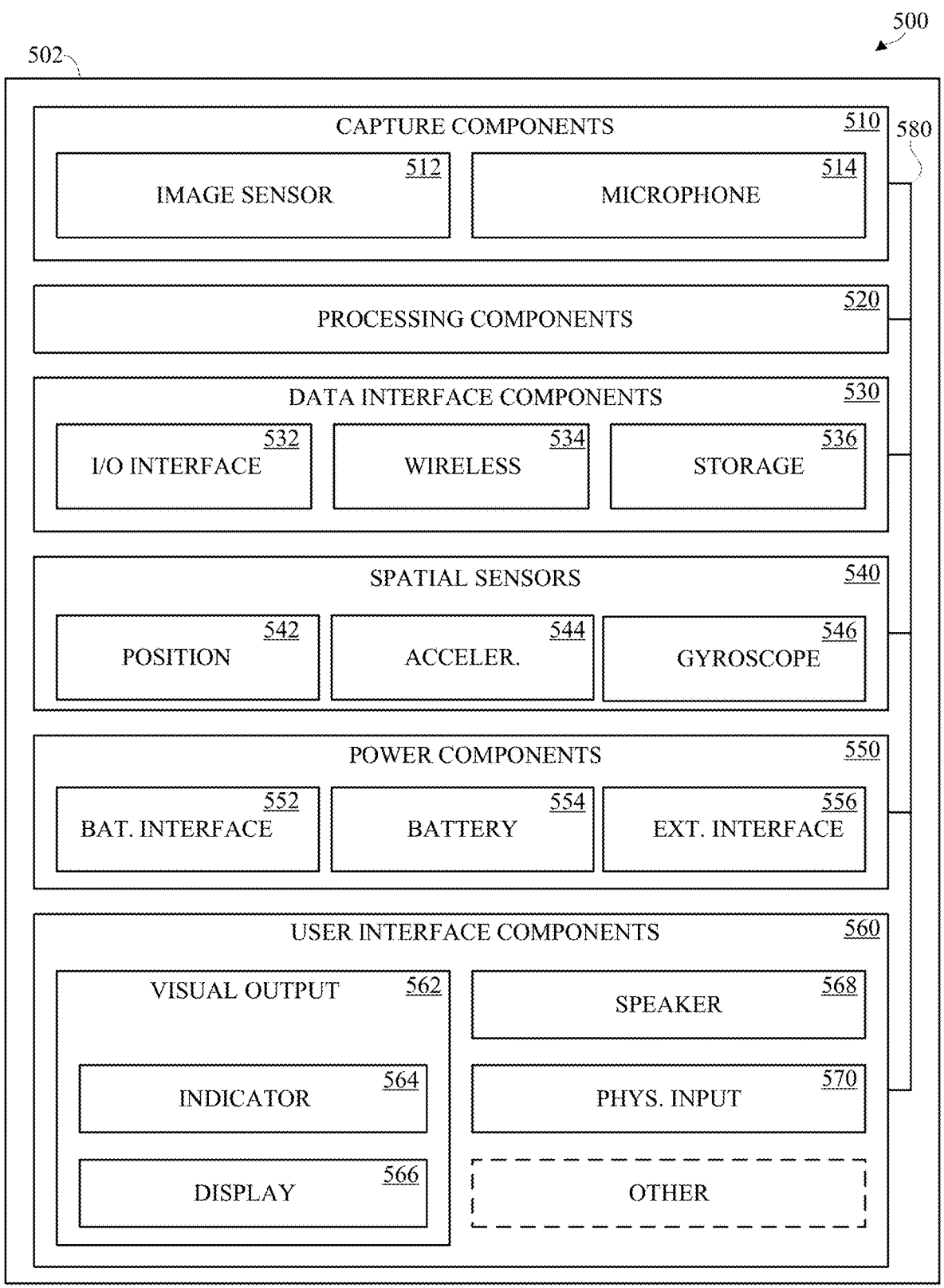
FIG. 5 is a block diagram of electronic components of an image capture apparatus.

FIGS. 1A-B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-B, the image capture apparatus 100 includes internal electronics, such as imaging electronics, power electronics, and the like, internal to the body 102 for capturing images and performing other functions of the image capture apparatus 100. An example showing internal electronics is shown in FIG. 5. The arrangement of the components of the image capture apparatus 100 shown in FIGS. 1A-B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptable 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
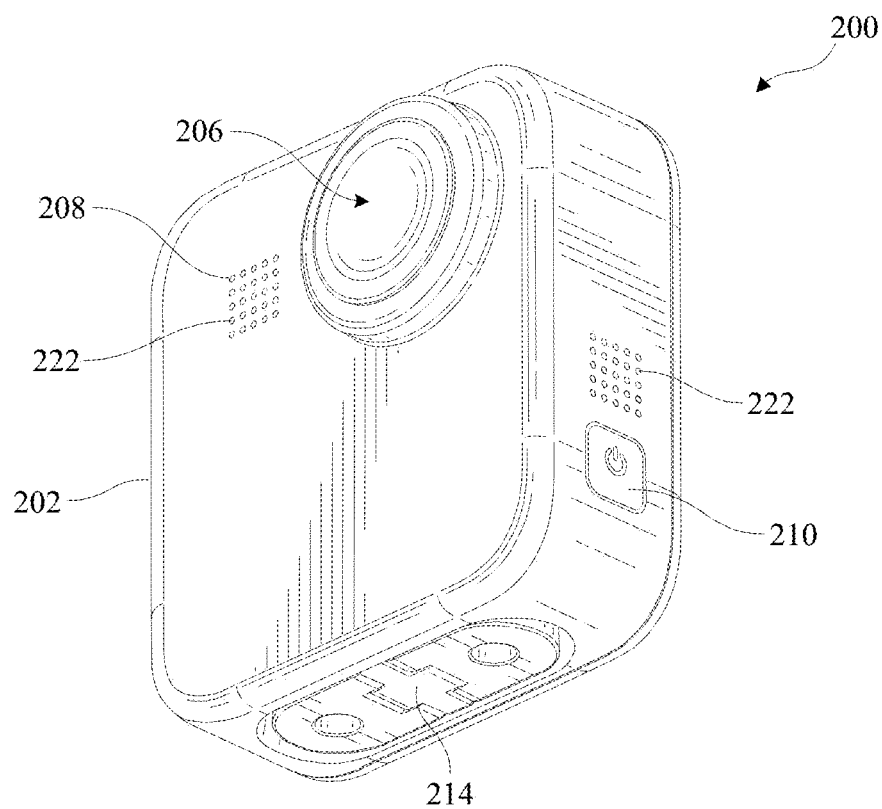
FIGS. 2A-B are isometric views of another example of an image capture apparatus.
Figure 2B:
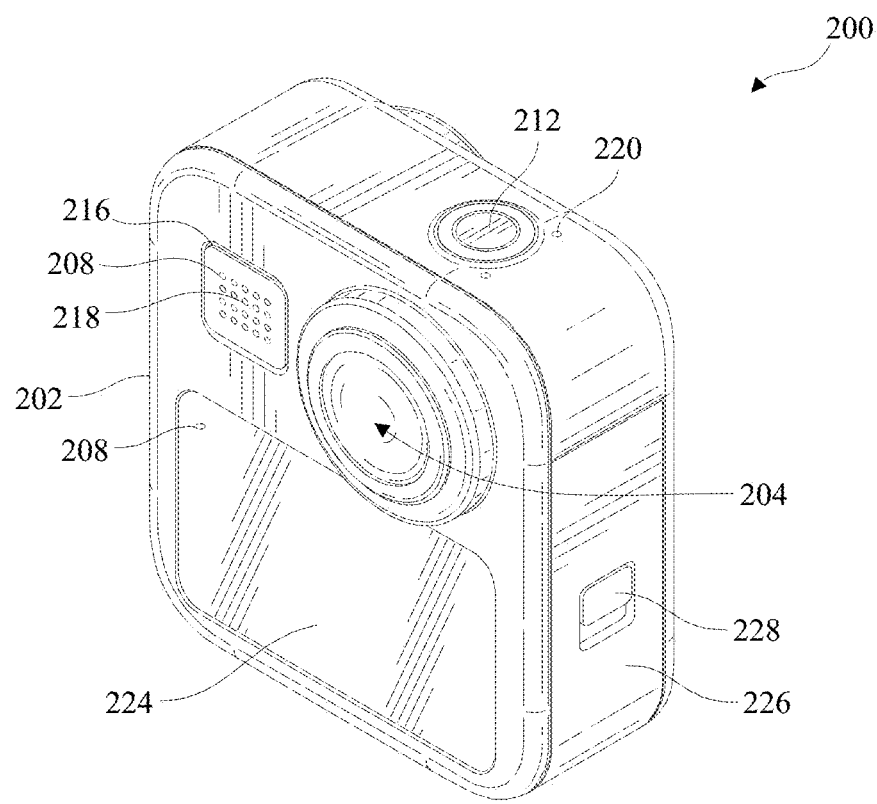

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A-B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 5.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O) interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
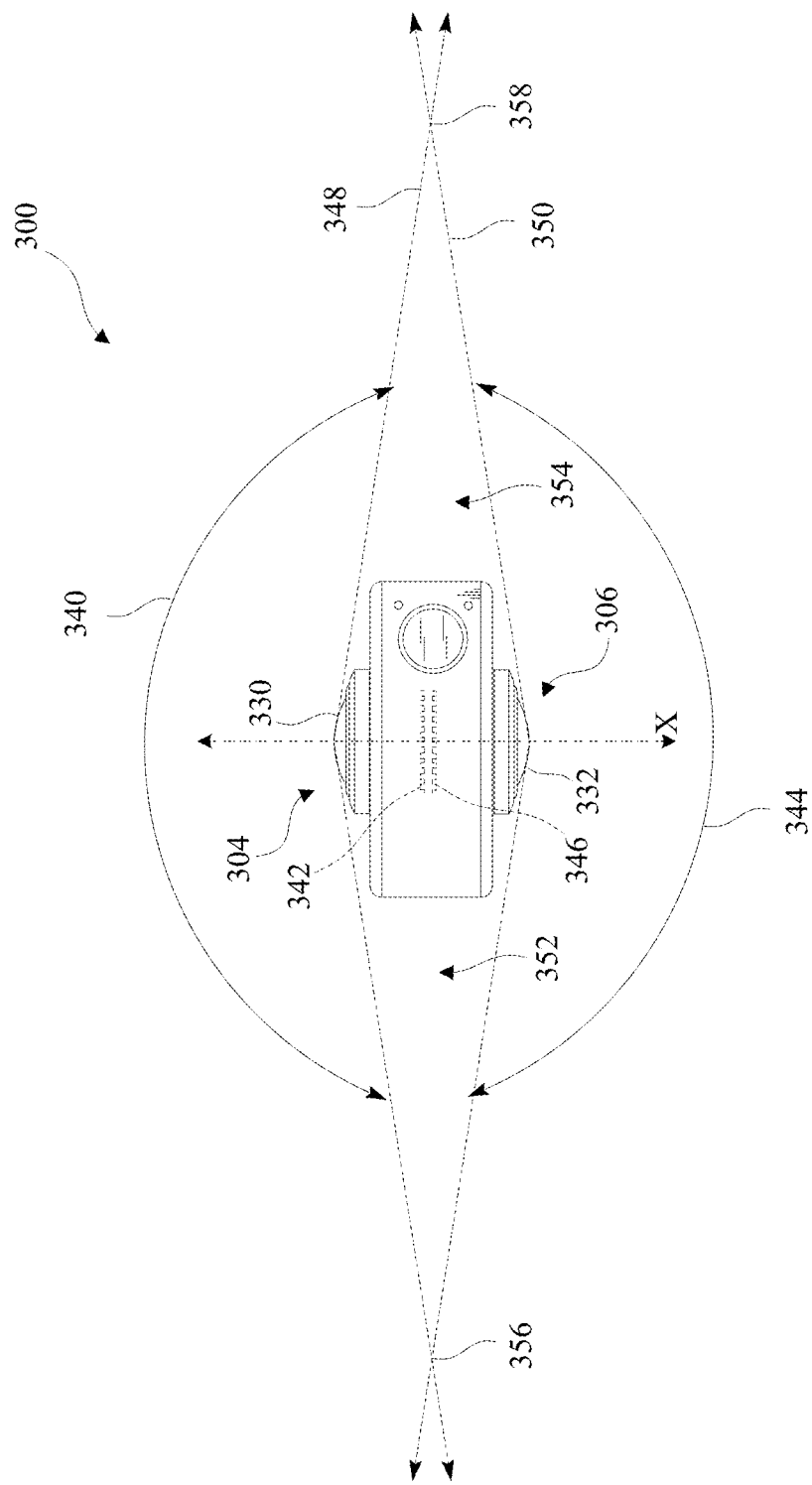
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions, and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The lenses 330, 332 may be aligned along an axis X as shown, laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 along the axis X may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

Figure 4A:
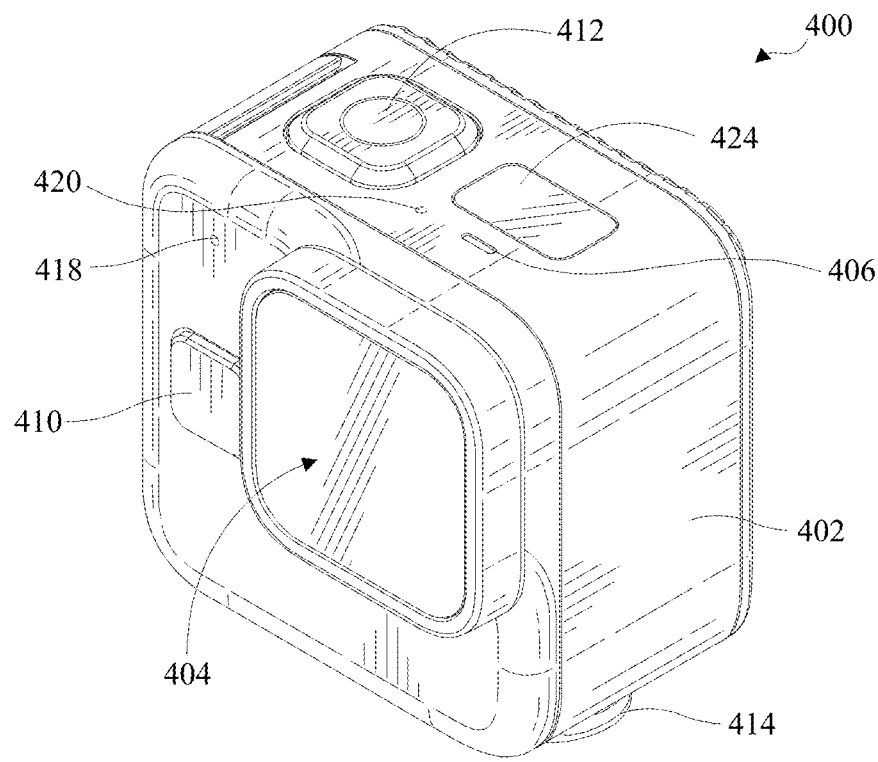
FIGS. 4A-4B are isometric views of another example of an image capture apparatus.
Figure 4B:
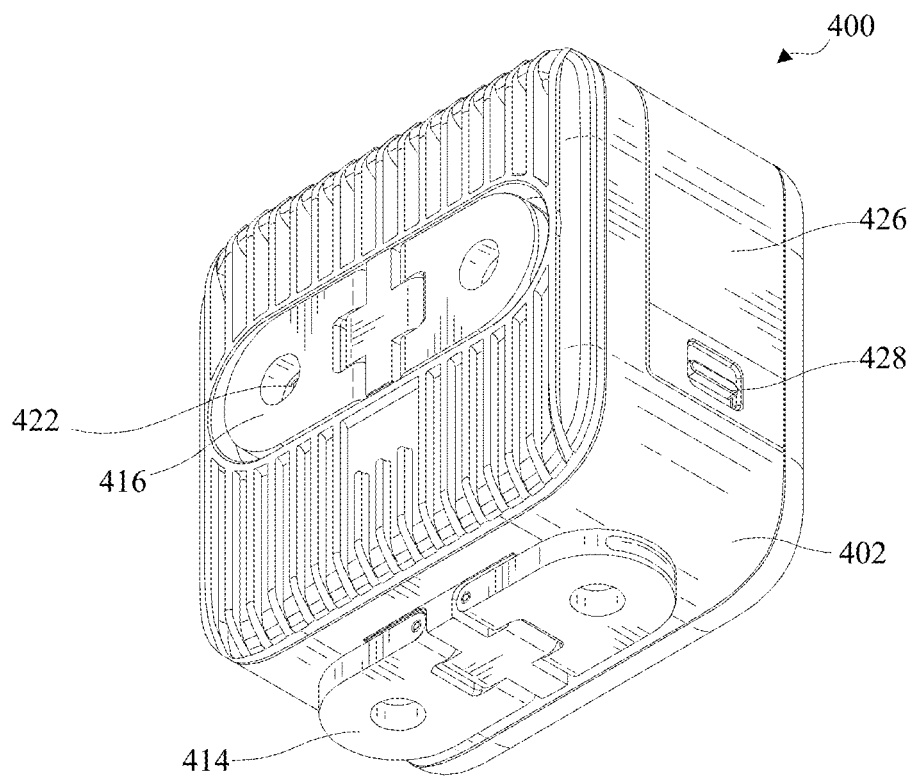

FIGS. 4A-4B illustrate another example of an image capture apparatus 400. The image capture apparatus 400 is similar to the image capture apparatus 100 shown in FIGS. 1A-1B and to the image capture apparatus 200 shown in FIGS. 2A-2B. The image capture apparatus 400 includes a body 402, an image capture device 404, an indicator 406, a mode button 410, a shutter button 412, interconnect mechanisms 414, 416, audio components 418, 420, 422, a display 424, and a door 426 including a release mechanism 428. The arrangement of the components of the image capture apparatus 400 shown in FIGS. 4A-4B is an example, other arrangements of elements may be used.

The body 402 of the image capture apparatus 400 may be similar to the body 102 shown in FIGS. 1A-1B. The image capture device 404 is structured on a front surface of the body 402. The image capture device 404 includes a lens and may be similar to the image capture device 104 shown in FIG. 1A.

As shown in FIG. 4A, the image capture apparatus 400 includes the indicator 406 on a top surface of the body 402. The indicator 406 may be similar to the indicator 106 shown in FIG. 1A. The indicator 406 may indicate a status of the image capture device 204. Although one indicator 406 is shown in FIG. 4A, the image capture apparatus 400 may include other indictors structured on respective surfaces of the body 402.

As shown in FIG. 4A, the image capture apparatus 400 includes input mechanisms including the mode button 410, structured on a front surface of the body 402, and the shutter button 412, structured on a top surface of the body 402. The mode button 410 may be similar to the mode button 110 shown in FIG. 1B. The shutter button 412 may be similar to the shutter button 112 shown in FIG. 1A.

The image capture apparatus 400 includes internal electronics (not expressly shown), such as imaging electronics, power electronics, and the like, internal to the body 402 for capturing images and performing other functions of the image capture apparatus 400. An example showing internal electronics is shown in FIG. 5.

As shown in FIGS. 4A-4B, the image capture apparatus 400 includes the interconnect mechanisms 414, 416, with a first interconnect mechanism 414 structured on a bottom surface of the body 402 and a second interconnect mechanism 416 disposed within a rear surface of the body 402. The interconnect mechanisms 414, 416 may be similar to the interconnect mechanism 140 shown in FIG. 1B and the interconnect mechanism 214 shown in FIG. 2A.

As shown in FIGS. 4A-4B, the image capture apparatus 400 includes the audio components 418, 420, 422 respectively structured on respective surfaces of the body 402. The audio components 418, 420, 422 may be similar to the microphones 128, 130, 132 and the speaker 138 shown in FIGS. 1A-1B. One or more of the audio components 418, 420, 422 may be, or may include, audio sensors, such as microphones, to receive and record audio signals, such as voice commands or other audio, in conjunction with capturing images or video. One or more of the audio components 418, 420, 422 may be, or may include, an audio presentation component that may present, or play, audio, such as to provide notifications or alerts.

As shown in FIGS. 4A-4B, a first audio component 418 is located on a front surface of the body 402, a second audio component 420 is located on a top surface of the body 402, and a third audio component 422 is located on a rear surface of the body 402. Other numbers and configurations for the audio components 418, 420, 422 may be used.

As shown in FIG. 4A, the image capture apparatus 400 includes the display 424 structured on a front surface of the body 402. The display 424 may be similar to the displays 108, 142 shown in FIGS. 1A-1B. The display 424 may include an I/O interface. The display 424 may receive touch inputs. The display 424 may display image information during video capture. The display 424 may provide status information to a user, such as status information indicating battery power level, memory card capacity, time elapsed for a recorded video, etc. The image capture apparatus 400 may include multiple displays structured on respective surfaces of the body 402. In some implementations, the display 424 may be omitted or combined with another component of the image capture apparatus 200.

As shown in FIG. 4B, the image capture apparatus 400 includes the door 426 structured on, or forming a portion of, the side surface of the body 402. The door 426 may be similar to the door 226 shown in FIG. 2B. The door 426 shown in FIG. 4B includes the release mechanism 428. The release mechanism 428 may include a latch, a button, or other mechanism configured to receive a user input that allows the door 426 to change position. The release mechanism 428 may be used to open the door 426 for a user to access a battery, a battery receptacle, an I/O interface, a memory card interface, etc.

In some embodiments, the image capture apparatus 400 may include features or components other than those described herein, some features or components described herein may be omitted, or some features or components described herein may be combined. For example, the image capture apparatus 400 may include additional interfaces or different interface features, interchangeable lenses, cold shoes, or hot shoes.

FIG. 5 is a block diagram of electronic components in an image capture apparatus 500. The image capture apparatus 500 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-B, the image capture apparatus 200 shown in FIGS. 2A-B, the image capture apparatus 300 shown in FIG. 3, or the image capture apparatus 400 shown in FIGS. 4A-4B, may be implemented as shown in FIG. 5.

The image capture apparatus 500 includes a body 502. The body 502 may be similar to the body 102 shown in FIGS. 1A-1B, the body 202 shown in FIGS. 2A-2B, or the body 402 shown in FIGS. 4A-4B. The body 502 includes electronic components such as capture components 510, processing components 520, data interface components 530, spatial sensors 540, power components 550, user interface components 560, and a bus 580.

The capture components 510 include an image sensor 512 for capturing images. Although one image sensor 512 is shown in FIG. 5, the capture components 510 may include multiple image sensors. The image sensor 512 may be similar to the image sensors 342, 346 shown in FIG. 3. The image sensor 512 may be, for example, a charge-coupled device (CCD) sensor, an active pixel sensor (APS), a complementary metal oxide semiconductor (CMOS) sensor, or an N-type metal oxide semiconductor (NMOS) sensor. The image sensor 512 detects light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 512 captures detected light as image data and conveys the captured image data as electrical signals (image signals or image data) to the other components of the image capture apparatus 500, such as to the processing components 520, such as via the bus 580.

The capture components 510 include a microphone 514 for capturing audio. Although one microphone 514 is shown in FIG. 5, the capture components 510 may include multiple microphones. The microphone 514 detects and captures, or records, sound, such as sound waves incident upon the microphone 514. The microphone 514 may detect, capture, or record sound in conjunction with capturing images by the image sensor 512. The microphone 514 may detect sound to receive audible commands to control the image capture apparatus 500. The microphone 514 may be similar to the microphones 128, 130, 132 shown in FIGS. 1A-1B, the audio components 218, 220, 222 shown in FIGS. 2A-2B, or the audio components 418, 420, 422 shown in FIGS. 4A-4B.

The processing components 520 perform image signal processing, such as filtering, tone mapping, or stitching, to generate, or obtain, processed images, or processed image data, based on image data obtained from the image sensor 512. The processing components 520 may include one or more processors having single or multiple processing cores. In some implementations, the processing components 520 may include, or may be, an application specific integrated circuit (ASIC) or a digital signal processor (DSP). For example, the processing components 520 may include a custom image signal processor. The processing components 520 conveys data, such as processed image data, with other components of the image capture apparatus 500 via the bus 580. In some implementations, the processing components 520 may include an encoder, such as an image or video encoder that may encode, decode, or both, the image data, such as for compression coding, transcoding, or a combination thereof.

Although not shown expressly in FIG. 5, the processing components 520 may include memory, such as a randomaccess memory (RAM) device, which may be non-transitory computer-readable memory. The memory of the processing components 520 may include executable instructions and data that can be accessed by the processing components 520.

The data interface components 530 communicates with other, such as external, electronic devices, such as a remote control, a smartphone, a tablet computer, a laptop computer, a desktop computer, or an external computer storage device. For example, the data interface components 530 may receive commands to operate the image capture apparatus 500. In another example, the data interface components 530 may transmit image data to transfer the image data to other electronic devices. The data interface components 530 may be configured for wired communication, wireless communication, or both. As shown, the data interface components 530 include an I/O) interface 532, a wireless data interface 534, and a storage interface 536. In some implementations, one or more of the I/O interface 532, the wireless data interface 534, or the storage interface 536 may be omitted or combined.

The I/O interface 532 may send, receive, or both, wired electronic communications signals. For example, the I/O interface 532 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 532 is shown in FIG. 5, the data interface components 530 include multiple I/O) interfaces. The I/O interface 532 may be similar to the data interface 124 shown in FIG. 1B.

The wireless data interface 534 may send, receive, or both, wireless electronic communications signals. The wireless data interface 534 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 534 is shown in FIG. 5, the data interface components 530 include multiple wireless data interfaces. The wireless data interface 534 may be similar to the data interface 124 shown in FIG. 1B.

The storage interface 536 may include a memory card connector, such as a memory card receptacle, configured to receive and operatively couple to a removable storage device, such as a memory card, and to transfer, such as read, write, or both, data between the image capture apparatus 500 and the memory card, such as for storing images, recorded audio, or both captured by the image capture apparatus 500 on the memory card. Although one storage interface 536 is shown in FIG. 5, the data interface components 530 include multiple storage interfaces. The storage interface 536 may be similar to the data interface 124 shown in FIG. 1B.

The spatial, or spatiotemporal, sensors 540 detect the spatial position, movement, or both, of the image capture apparatus 500. As shown in FIG. 5, the spatial sensors 540 include a position sensor 542, an accelerometer 544, and a gyroscope 546. The position sensor 542, which may be a global positioning system (GPS) sensor, may determine a geospatial position of the image capture apparatus 500, which may include obtaining, such as by receiving, temporal data, such as via a GPS signal. The accelerometer 544, which may be a three-axis accelerometer, may measure linear motion, linear acceleration, or both of the image capture apparatus 500. The gyroscope 546, which may be a three-axis gyroscope, may measure rotational motion, such as a rate of rotation, of the image capture apparatus 500. In some implementations, the spatial sensors 540 may include other types of spatial sensors. In some implementations, one or more of the position sensor 542, the accelerometer 544, and the gyroscope 546 may be omitted or combined.

The power components 550 distribute electrical power to the components of the image capture apparatus 500 for operating the image capture apparatus 500. As shown in FIG. 5, the power components 550 include a battery interface 552, a battery 554, and an external power interface 556 (ext. interface). The battery interface 552 (bat. interface) operatively couples to the battery 554, such as via conductive contacts to transfer power from the battery 554 to the other electronic components of the image capture apparatus 500. The battery interface 552 may be similar to the battery receptacle 126 shown in FIG. 1B. The external power interface 556 obtains or receives power from an external source, such as a wall plug or external battery, and distributes the power to the components of the image capture apparatus 500, which may include distributing power to the battery 554 via the battery interface 552 to charge the battery 554. Although one battery interface 552, one battery 554, and one external power interface 556 are shown in FIG. 5, any number of battery interfaces, batteries, and external power interfaces may be used. In some implementations, one or more of the battery interface 552, the battery 554, and the external power interface 556 may be omitted or combined. For example, in some implementations, the external interface 556 and the I/O) interface 532 may be combined.

The user interface components 560 receive input, such as user input, from a user of the image capture apparatus 500, output, such as display or present, information to a user, or both receive input and output information, such as in accordance with user interaction with the image capture apparatus 500.

As shown in FIG. 5, the user interface components 560 include visual output components 562 to visually communicate information, such as to present captured images. As shown, the visual output components 562 include an indicator 564 and a display 566. The indicator 564 may be similar to the indicator 106 shown in FIG. 1A, the indicators 208 shown in FIGS. 2A-2B, or the indicator 406 shown in FIG. 4A. The display 566 may be similar to the display 108 shown in FIG. 1A, the display 142 shown in FIG. 1B, the display 224 shown in FIG. 2B, or the display 424 shown in FIG. 4A. Although the visual output components 562 are shown in FIG. 5 as including one indicator 564, the visual output components 562 may include multiple indicators. Although the visual output components 562 are shown in FIG. 5 as including one display 566, the visual output components 562 may include multiple displays. In some implementations, one or more of the indicator 564 or the display 566 may be omitted or combined.

As shown in FIG. 5, the user interface components 560 include a speaker 568. The speaker 568 may be similar to the speaker 138 shown in FIG. 1B, the audio components 218, 220, 222 shown in FIGS. 2A-2B, or the audio components 418, 420, 422 shown in FIGS. 4A-4B. Although one speaker 568 is shown in FIG. 5, the user interface components 560 may include multiple speakers. In some implementations, the speaker 568 may be omitted or combined with another component of the image capture apparatus 500, such as the microphone 514.

As shown in FIG. 5, the user interface components 560 include a physical input interface 570. The physical input interface 570 may be similar to the mode buttons 110, 210, 410 shown in FIGS. 1A, 2A, and 4A or the shutter buttons 112, 212, 412 shown in FIGS. 1A, 2B, and 4A. Although one physical input interface 570 is shown in FIG. 5, the user interface components 560 may include multiple physical input interfaces. In some implementations, the physical input interface 570 may be omitted or combined with another component of the image capture apparatus 500. The physical input interface 570 may be, for example, a button, a toggle, a switch, a dial, or a slider.

As shown in FIG. 5, the user interface components 560 include a broken line border box labeled "other" to indicate that components of the image capture apparatus 500 other than the components expressly shown as included in the user interface components 560 may be user interface components. For example, the microphone 514 may receive, or capture, and process audio signals to obtain input data, such as user input data corresponding to voice commands. In another example, the image sensor 512 may receive, or capture, and process image data to obtain input data, such as user input data corresponding to visible gesture commands. In another example, one or more of the spatial sensors 540, such as a combination of the accelerometer 544 and the gyroscope 546, may receive, or capture, and process motion data to obtain input data, such as user input data corresponding to motion gesture commands.

Figure 6A:
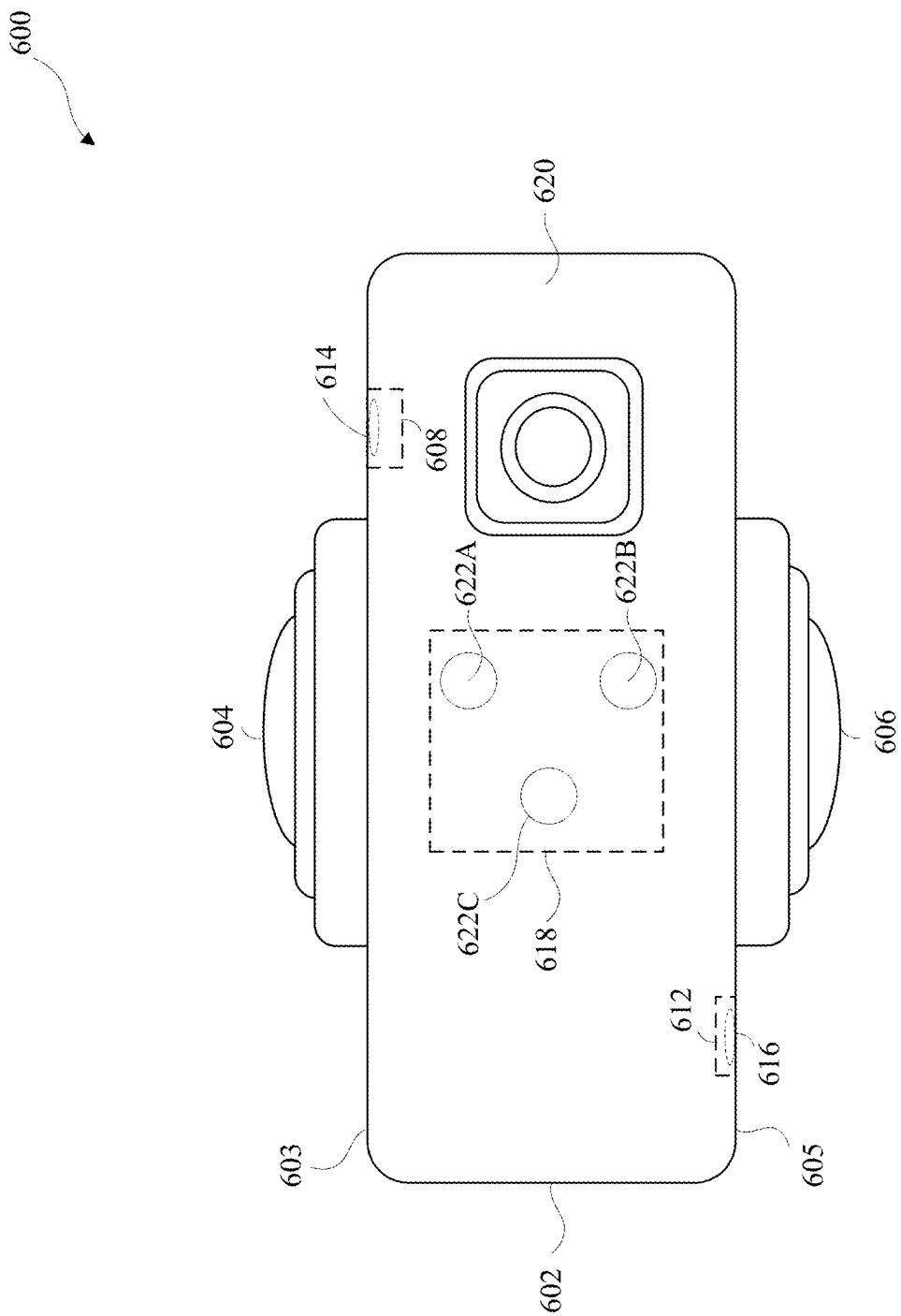
FIG. 6A is a diagram of a top-view of an image capture device in accordance with embodiments of this disclosure.

FIG. 6A is a diagram of an example of a top view of an image capture apparatus 600. The image capture apparatus 600 comprises a camera body 602 having two camera lenses 604, 606 structured on front and back surfaces 603, 605 of the camera body 602. The two lenses 604, 606 are oriented in opposite directions and couple with two image sensors mounted on circuit boards (not shown). Other electrical camera components (e.g., an image processor, camera SoC (system-on-chip), etc.) may also be included on one or more circuit boards within the camera body 602 of the image capture apparatus 600.

The lenses 604, 606 may be in a back-to-back configuration as shown, or laterally offset from each other, such that they are off-center from a central axis of the image capture apparatus 600, or such that they are laterally offset and off-center from the central axis. The image capture apparatus 600 includes a microphone array that comprises a front-facing component 608, a rear-facing component 612, and a top-facing component 618. The top-facing component 618 may be on any side of the image capture apparatus 600 that is perpendicular to the front-facing component 608 and the rear-facing component 612, such as on a top surface, a bottom surface, a left surface, a right surface, or any combination thereof. As shown in FIG. 6A, the front-facing component 608 is disposed on the front surface 603 of the image capture apparatus 600. The front-facing component 608 may include one or more microphone elements 614 shown in dashed line as hidden in the top view of FIG. 6A. In an example where there are multiple microphone elements 614, the microphone elements 614 may be configured such that they are distanced approximately 6 mm to 18 mm apart from each other. In an example, the microphone elements 614 may be spaced approximately 11.5 mm apart to improve low frequency directionality and to minimize white noise gain. The rear-facing component 612 is disposed on the back surface 605 of the image capture apparatus 600. The rear-facing component 612 may include one or more microphone elements 616 shown in dashed line as hidden in the top view of FIG. 6A. One or more of the microphone elements 616 may be configured as a drain microphone. The top-facing component 618 is shown on a top surface 620 of the image capture apparatus 600 in this example.

The top-facing component 618 may include one or more microphone elements 622A-C. The microphone elements 622A-C are arranged in an equilateral triangular configuration such that the internal angles of the equilateral triangle are each 60 degrees. The equilateral triangle configuration may be implemented to maximize the microphone spacing for stereo separation. The use of the equilateral triangle configuration provides for white noise gain that has fewer weak points due to a consistent microphone element spacing across any chosen beam direction. The microphone elements 622A-C may be configured such that they are distanced approximately 6 mm to 18 mm apart. The 6 mm to 18 mm spacing may determine the bandwidth of the output. For example, the larger the spacing, the lower the highest resolvable frequency. The spacing may be adjusted depending on the resolution required. In an example, the microphone elements 622A-C may be spaced approximately 11.5 mm apart to improve low frequency directionality and to minimize white noise gain. White noise gain discrepancies may be minimized by maintaining the noted spacing between all microphone pairs. Placing the microphone elements 622A-C of the top surface 620 of the image capture apparatus 600 may correct for some acoustic shadowing that can be caused by the placement of these microphone elements on the front surface 603.

Figure 7:
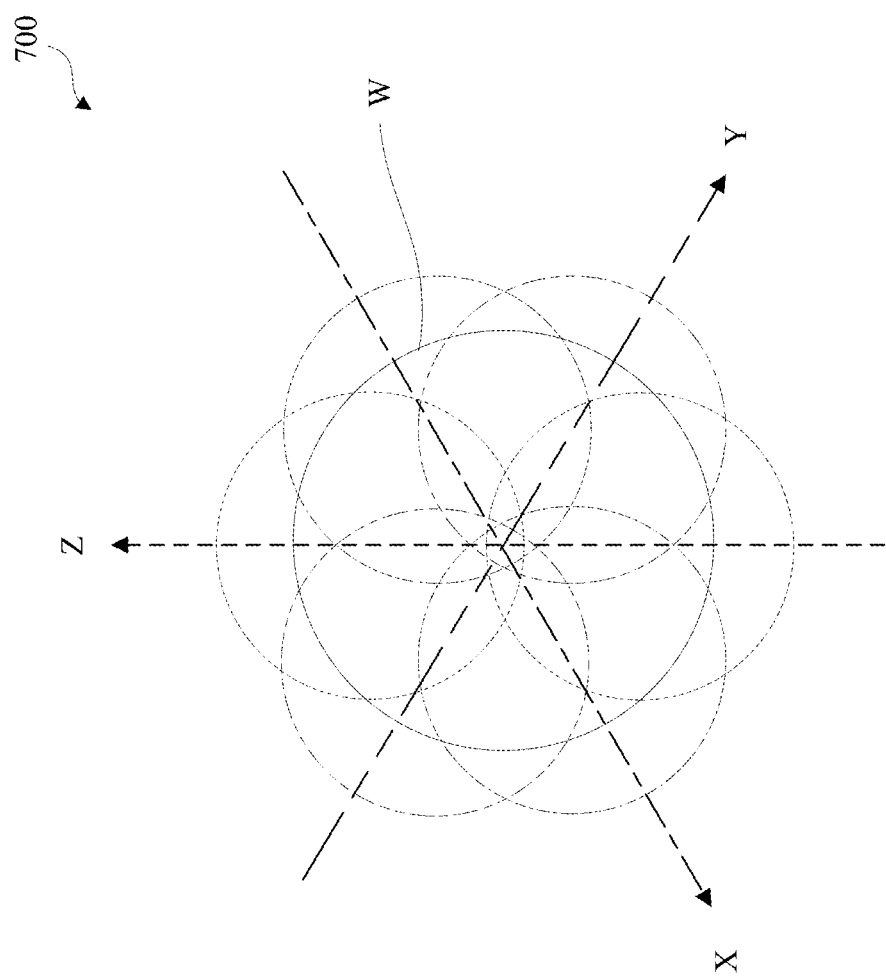
FIG. 7 is a diagram of a First Order Ambisonics B format sensitivity plot.
Figure 8:
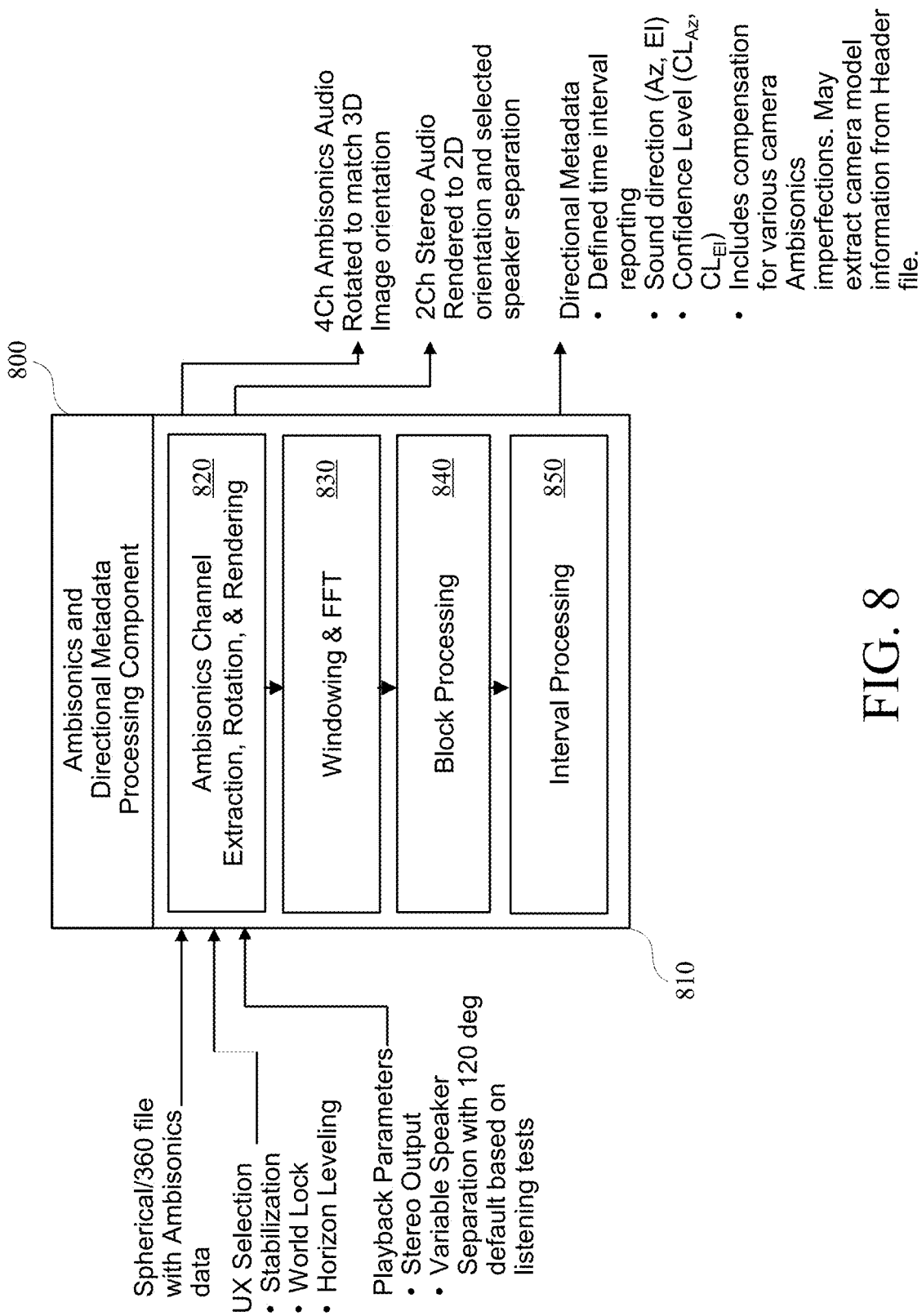
FIG. 8 block diagram of a processing component which includes a flow diagram of a method 810 for determining direction of arrival of audio from a spherical image capture device in accordance with embodiments of this disclosure.

The front-facing component 608, the microphone elements 614, the rear-facing component 612, and the microphone elements 616 are shown in broken lines as they may not be visible in this view. The front-facing component 608 and the top-facing component 618 of the microphone array may represent microphone elements on X, Y, Z axes to create X, Y, Z components of a First Order Ambisonics B-Format, as shown in FIG. 7. In some examples, the front-facing component 608, the rear-facing component 612, and the top-facing component 618 of the microphone array may represent microphone elements on X, Y, Z axes to create X, Y, Z components of the First Order Ambisonics B-Format, as shown in FIG. 8. These microphone elements may be oriented on a sphere or off-axis and the signals from them may be transformed to the First Order Ambisonics B-Format.

Figure 6B:
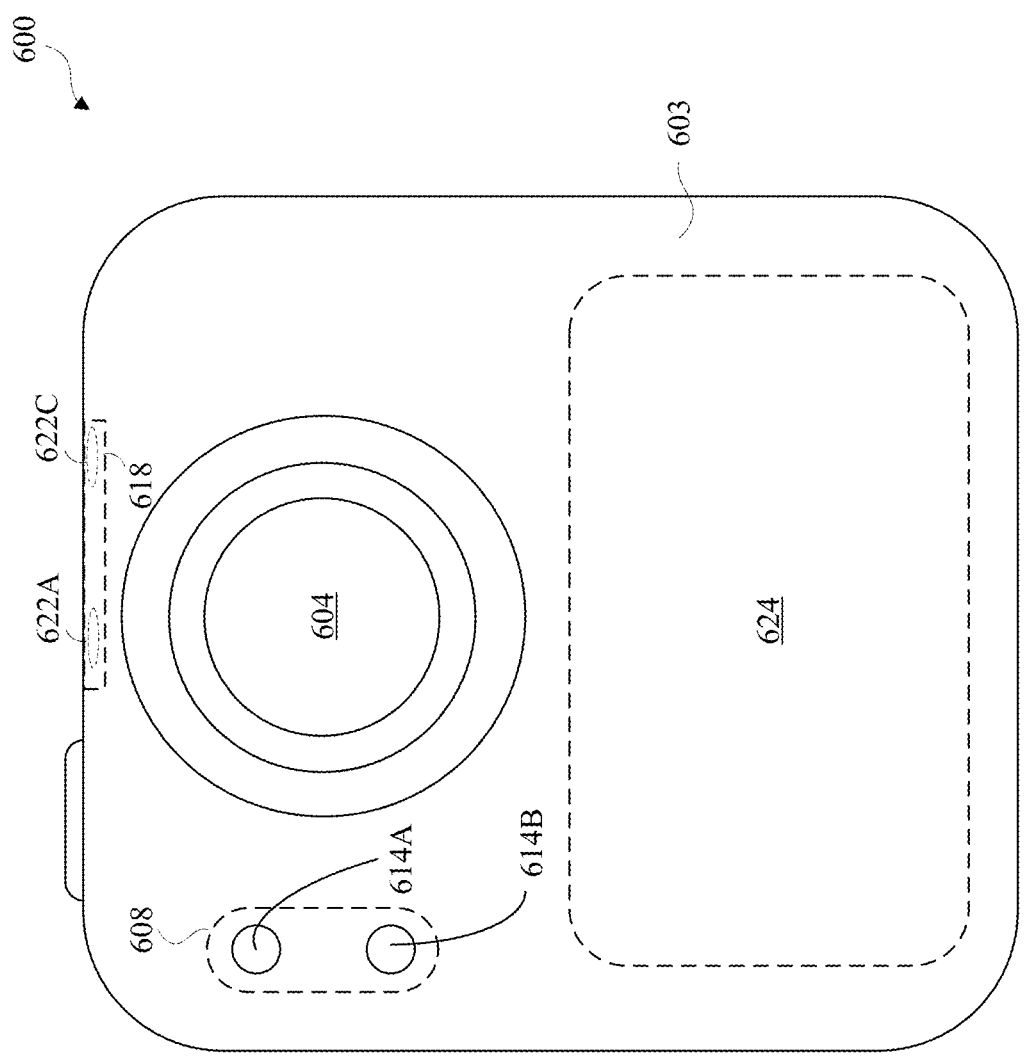
FIG. 6B is a diagram of a front-view of the image capture device shown in FIG. 6A in accordance with embodiments of this disclosure.

FIG. 6B is a diagram of an example of a front view of the image capture apparatus 600 shown in FIG. 6A. As shown in FIG. 6B, the front surface 603 of the image capture apparatus 600 comprises the camera lens 604 and the front-facing component 608. Although the front-facing component 608 may include any number of microphone elements, the example shown in FIG. 6B includes two microphone elements 614A and 614B in a vertical configuration. Each of the microphone elements 614A and 614B may be configured such that they are distanced approximately 6 mm to 18 mm apart. In an example, the microphone elements 614A and 614B may be spaced 11.5 mm apart to improve low frequency directionality and to minimize white noise gain. The top-facing component 618 and the microphone elements 622A and 622C are shown in broken lines as they may not be visible in this view. In some implementations, the image capture apparatus 600 may include a display 624 on the front surface 603, the display 624 is shown in dashed line as optional.

Figure 6C:
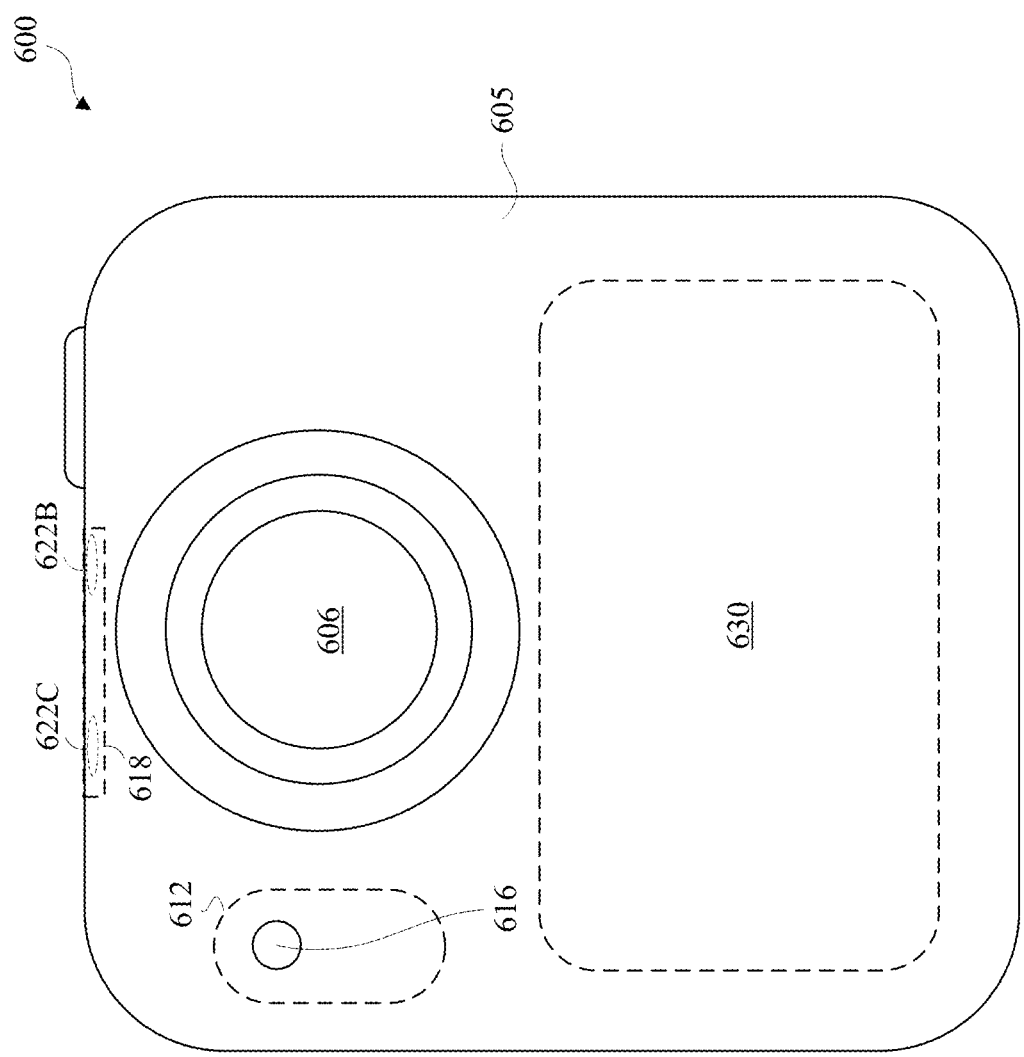
FIG. 6C is a diagram of a rear-view of the image capture device shown in FIG. 6A in accordance with embodiments of this disclosure.

FIG. 6C is a diagram of an example of a rear view of the image capture apparatus 600 shown in FIGS. 6A and 6B. As shown in FIG. 6C, the back surface 605 of the image capture apparatus 600 comprises the camera lens 606 and the rear-facing component 612. Although the rear-facing component 612 may include any number of microphone elements, the example shown in FIG. 6B includes one microphone element 616. In some implementations, the microphone element 616 may be a drain microphone. The top-facing component 618 and the microphone elements 622B and 622C are shown in broken lines as they may not be visible in this view. In some implementations, the image capture apparatus 600 may include a display 630 on the back surface 605. The display 630 is shown in dashed line as optional.

FIG. 7 is a diagram of an example of a First Order Ambisonics B format sensitivity plot 700. The sensitivity plot 700 is an example of a pickup pattern of virtual microphones that are created through the processing of the signals from all or some of the omnidirectional microphone elements. In an example, the sensitivity plot 700 may be created from directional microphones. The front-facing component 608, rear-facing component 612, and top-facing component 618 of the microphone array of FIG. 6A may be used to capture omnidirectional signals and transform the omnidirectional signals into a first order Ambisonics B-format. The first order Ambisonics B-format may include four signals corresponding to three figure-8 signals X, Y, Z and one mono signal W, as shown in FIG. 7. Each signal X, Y, and Z may represent a respective axis in a three-dimensional sound field such the sound field represented by the sensitivity plot 700.

The signals may be arranged into channels. For example, a W-channel may represent the mono sound pressure, an X-channel may represent a front-minus-back sound pressure gradient, a Y-channel may represent a left-minus-right sound pressure gradient, and a Z-channel may represent an up-minus-down sound pressure gradient. This four-channel format may represent the sensitivity plot 700.

Microphone elements such as microphone elements 614A-B and microphone elements 622A-C may be oriented in such a way that a pair of microphone elements reside on each of the X, Y, and Z axis. In an example, each pair of microphone elements may be used to create a figure-8 signal on each axis as shown in FIG. 7. The mono channel W may be created from a single microphone element or a sum of two or more microphone elements. In an example, a drain microphone may not be used for Ambisonics.

FIG. 8 is a block diagram of a processing component 800 which includes a flow diagram of a method 810 for determining direction of arrival of audio for a dual lens or a spherical image capture device (collectively "dual lens") in accordance with embodiments of this disclosure. The processing component 800 can be, for example, one of the processing components 520 of FIG. 5. In an implementation, the processing component 800 can be an Ambisonics and directional metadata processing component. The processing done by the processing component 800 may be applicable to both on-camera (on an image capture device) and off-camera applications (done on an external device and/or processing system). In the on-camera application, the spherical and/or 360 file may be absent and the inputs would come from the on-camera microphone signals. In the on-camera application, the user selection of World Lock and Horizon Level would not be present. The processing component 800 can output 4-channel Ambisonics audio, 2-channel stereo audio, and directional metadata as described herein. The directional metadata can include, but is not limited to, time interval, estimated DOAA with estimated azimuth and elevation angle pair, i.e., sound direction, confidence level for each of the estimated azimuth and the elevation angle, dual lens image capture device information, and/or Ambisonics compensation factors.

Figure 9:
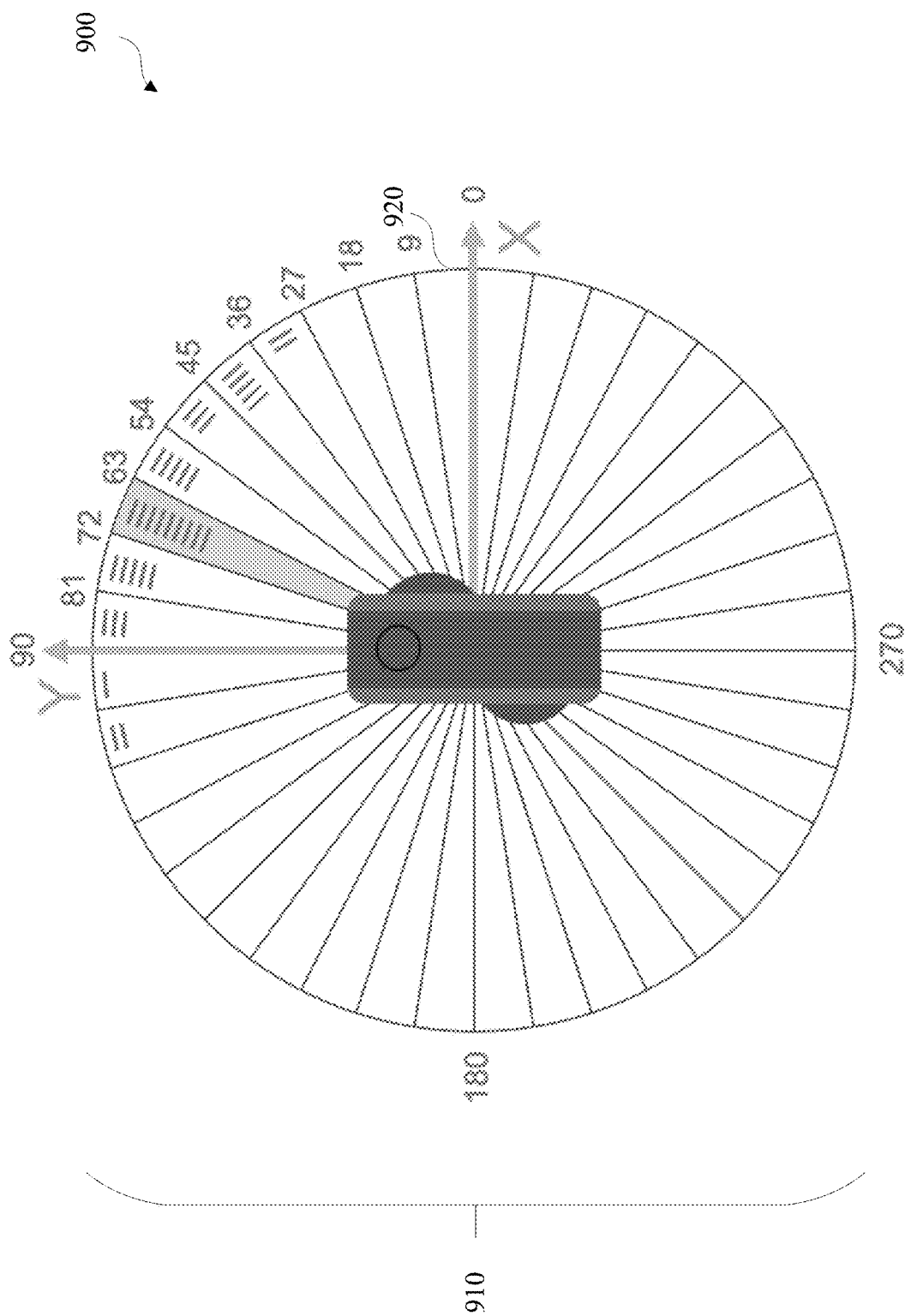
FIG. 9 is a diagram of azimuth segments in accordance with embodiments of this disclosure.
Figure 10:
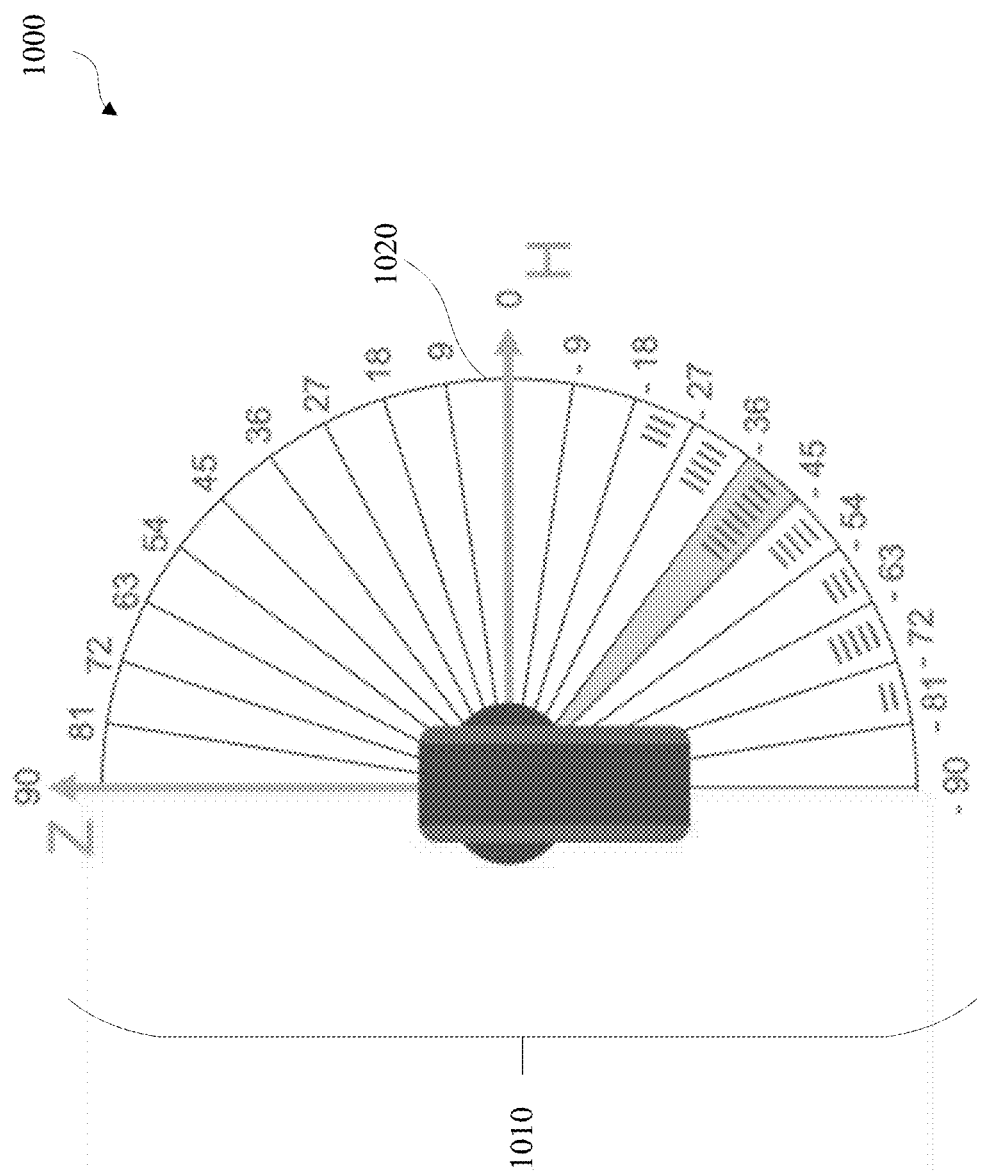
FIG. 10 is a diagram of elevation segments in accordance with embodiments of this disclosure.

For the processing component 800 and the method 810, an azimuth plane of 360° is divided into a defined number of azimuth segments and an elevation space of −90° to +90° is divided into a defined number of elevation segments. FIG. 9 is a diagram of azimuth segments in accordance with embodiments of this disclosure. An azimuth plane 900 is divided into a defined number of azimuth segments 910. In implementations, the defined number of azimuth segments is 40. That is, each azimuth segment 920 is a 9° segment. FIG. 10 is a diagram of elevation segments in accordance with embodiments of this disclosure. An elevation space 1000 is divided into a defined number of elevation segments 1010. In implementations, the defined number of azimuth segments is 20. That is, each azimuth segment 1020 is a 9° segment. Angle estimates stored in the defined number of azimuth segments 910 and angle estimates stored in the defined number of elevation segments 1010 are used to estimate a DOAA for a defined interval of time as described herein.

At 820, for the on-camera operation, the method 810 includes receiving W, X, Y and Z Ambisonics channel data, information, and/or signals (collectively "Ambisonics signals") from microphones in the dual lens image capture device as described herein with respect to FIGS. 6A-C and 7. For the off-camera operation, the Ambisonics channel data would come from the spherical and/or 360 file. The Ambisonics signals is received for a defined interval of time. In implementations, the defined interval of time is configurable. In implementations, the defined interval of time is system configurable. In implementations, the defined interval of time is approximately 0.2 seconds. The method 810 is applicable to both on-camera and off-camera applications. At 820, for the off-camera applications, user specified options of rotation, including but not limited to, stabilization, world-lock, and horizon leveling, are first applied to the Ambisonics signals prior to further DOAA estimation processing. At 820, for the on-camera applications, the Ambisonics signals are used directly for estimating the DOAA. That is, the rotation options are not applied to the Ambisonics signals.

At 830, the Ambisonics signals for the defined interval of time is divided into a defined number of blocks (e.g., audio blocks). In implementations, the defined number of blocks is system configurable, user configurable, or combinations thereof. In implementations, the defined number of blocks is 38. In implementations, each block is approximately 5.33 milliseconds. In implementations, each block may include approximately 256 samples of the Ambisonics signals. In implementations, the defined number of blocks is consecutive.

Each block of time domain samples may be converted into the frequency domain and may be divided into a defined number of frequency domain bins of spectral values, where a spectral value is a representation of the energy level in a frequency domain bin (this may also be referred to as performing a Fourier transform on the block). In implementations, the defined number of frequency domain bins is system configurable, user configurable, or combinations thereof. In implementations, the defined number of frequency domain bins is 512, where 256 samples are new or from a current block and 256 samples are from the previous block. A subset of the defined number of frequency domain bins may be used or selected for further processing. In implementations, the subset may be 80 frequency domain bins, where separation between the frequency domain bins is approximately 95 Hz. The subset of frequency domain bins may be referred to as valid frequency domain bins.

At 840, each block, using the valid frequency domain bins, may be reviewed to determine whether it is an error block or a valid block. This analysis may be done using a first signal threshold for the W channel and a second signal threshold for each of the X, Y, and Z channels. The first signal threshold and the second signal threshold may be experimentally set to eliminate a substantial number of DOAA estimate outliers encountered during DOAA estimation trials. In implementations, the first signal threshold and the second signal threshold may be configurable. In implementations, the first signal threshold and the second signal threshold may be system configurable. In implementations, a threshold multiplier may be used for establishing the second signal thresholds used for X, Y and Z channels. In implementations, value for the threshold multiplier may be configurable. In implementations, value for the threshold multiplier may be system configurable. In implementations, the value of the threshold multiplier was experimentally optimized. In implementations, an optimum value of the threshold multiplier was experimentally determined to be 2.0. The optimum value resulted in the most correct number of DOAA estimates.

It is first determined whether the block, using the valid frequency domain bins exceeds a defined active signal threshold. This is the first signal threshold noted above. In implementations, the defined active signal threshold is configurable. In implementations, the defined active signal threshold is system configurable. In implementations, value of the active signal threshold is experimentally defined to be at an absolute level $1.0 \times 10^{-8}$. If the total energy in the valid frequency domain bins for the W channel exceeds the value of the active signal threshold, then the block may be used for further DOAA processing, i.e., it is designated or identified as a valid block. If the total energy in the valid frequency domain bins for the W channel is equal to or less than the value of the active signal threshold, the block is rejected as an error block.

For each valid block, it is then determined for each channel X, for each valid frequency domain bin, a X channel energy contribution to the W channel energy. The X channel energy contribution may be stored in a X channel energy contribution array. The X channel energy contribution may be accumulated for all of the valid frequency domain bins and an average for the X channel energy contribution may be determined for the block. Similarly, a Y channel energy contribution to the W channel energy may be determined and stored in a Y channel energy contribution array and an average for the Y channel energy contribution may be determined for the block. Similarly, a Z channel energy contribution to the W channel energy may be determined and stored in a Z channel energy contribution array and an average for the Z channel energy contribution may be determined for the block.

The X, Y, and Z second signal thresholds for each of the X, Y, and Z channels may then be computed from the average X channel energy contribution, the average Y channel energy contribution, and the average Z channel energy contribution, respectively, using the threshold multiplier.

The X, Y, and Z second signal thresholds may then be used to determine and identify the defined number of key frequency domain bins and their indices. For each frequency domain bin index of the frequency domain valid bins, magnitude components of each of the X, Y and Z channels may be computed and compared with its corresponding X, Y, and Z second signal thresholds, respectively. For a frequency domain bin index, if at least one of the X, Y, and Z channels exceeds its corresponding X, Y, and Z second signal thresholds, respectively, the frequency domain bin index may be identified as a key frequency domain bin index. All key frequency domain bin indices may be stored and used for calculating the azimuth and elevation angle estimations for each of these key frequency domain bin indices. If no such key frequency domain bin is found for the block, the block is declared an error block.

The azimuth and elevation angle estimations may be determined for each non-error block. Intensity vectors may be determined for each of the key frequency domain bin indices in the non-error block as described in "Estimation of Direction of Arrival of Multiple Sound Sources in 3D Space Using B-Format, by H. Khaddour, J. Schimmel, and M. Trzos, International Journal of Advances in Telecommunications, Electrotechnics, Signals System, Vol. 2, No. 2 (2013), the contents of which are herein incorporated by reference as if set forth herein. In implementations, the intensity vectors may be determined as follows:

$$I_x(t, f) = \frac{1}{\sqrt{2} z_0} \text{Re}\{W^*(t, f) \cdot X(t, f)\} \quad \text{EQUATION (1)}$$

$$I_y(t, f) = \frac{1}{\sqrt{2} z_0} \text{Re}\{W^*(t, f) \cdot Y(t, f)\} \quad \text{EQUATION (2)}$$

$$I_z(t, f) = \frac{1}{\sqrt{2} z_0} \text{Re}\{W^*(t, f) \cdot Z(t, f)\} \quad \text{EQUATION (3)}$$

where $Z_0$ is the acoustic impedance of air, t is time, f is frequency, * denotes complex conjugate, X(t, f), Y(t, f), Z(t, f), and W(t, f) are the Fourier transforms for the X, Y, X, and W channels of x(t), y(t), z(t), and w(t), respectively.

The intensity vectors may then be used to determine azimuth ($\alpha$) and elevation ($\beta$) angle estimations as follows:

$$\alpha(t, f) = \begin{cases} \tan^{-1}\left[\frac{-I_y(t, f)}{-I_x(t, f)}\right] & \text{for } I_x(t, f) \geq 0 \\ \tan^{-1}\left[\frac{-I_y(t, f)}{-I_x(t, f)}\right] - 180° & \text{for } I_x(t, f) < 0 \end{cases}, \quad \text{EQUATION (4)}$$

$$\beta(t, f) = \left[\frac{I_z(t, f)}{\sqrt{I_x(t, f)^2 + I_y(t, f)^2}}\right] \quad \text{EQUATION (5)}$$

The azimuth ($\alpha$) and elevation ($\beta$) angle estimations may then be stored in the appropriate azimuth and elevation segments, respectively, using their respective segment indices.

For the valid block, the azimuth segment with the largest number of azimuth angle estimations may be determined. An average value of the azimuth angle estimations may be computed. An index number of the azimuth segment and the average azimuth angle estimation are stored in an interval array. Similarly, the elevation segment with the largest number elevation angle estimations may be determined. An average value of the elevation angle estimations may be computed. The index number of the elevation segment and the average elevation angle estimation are stored in the interval array.

At 850, after processing the defined number of blocks in the defined interval of time, it may be determined whether azimuth angle estimations have been computed for more than a defined number of valid blocks in the defined interval of time. In implementations, the defined number of valid blocks may be a defined percentage of the defined number of blocks in the defined time interval. In implementations, the defined percentage may be 25% of the defined number of blocks. In implementations, the defined number of valid blocks or the defined percentage may be configurable. In implementations, the defined number of valid blocks or the defined percentage may be system configurable. For the defined interval of time, a similar determination is made for elevation angle estimations using the defined number of valid blocks and/or the defined percentage. A block index may be used for the blocks.

Figure 11:
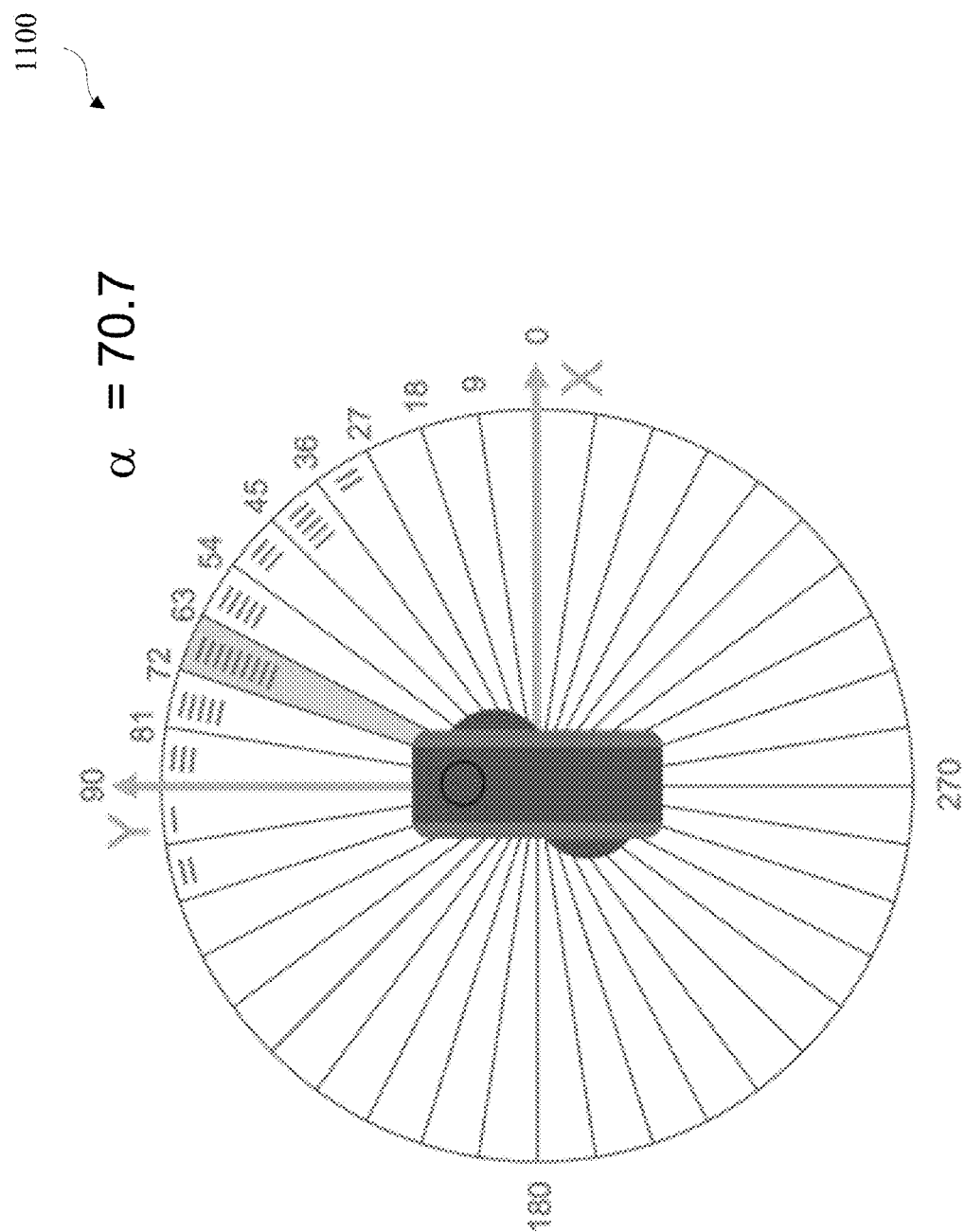
FIG. 11 is a diagram with an estimated azimuth angle in accordance with embodiments of this disclosure.

If azimuth angle estimations and elevation angle estimations have been computed for the defined number of valid blocks, then the azimuth segment which contains the maximum number of azimuth angle estimates with the largest block index is identified for the interval. An average azimuth angle estimation for the defined time interval may be computed from the stored azimuth angle estimates from this identified segment, i.e., this is the DOAA azimuth angle estimate. FIG. 11 is a diagram 1100 with an estimated azimuth angle in accordance with embodiments of this disclosure. Similarly, the elevation segment which contains the maximum number of average elevation angle estimates with the largest block index is identified for the interval. An average elevation angle estimate for the defined time interval may be computed from the stored elevation angle estimates, i.e., this is the DOAA elevation angle estimate. In implementations, selection of the azimuth and elevation segments may use a procedure to determine that the azimuth and elevation angles come from the same block index to ensure that the azimuth and elevation angles were estimated for the same time instant. If the block indices for the identified azimuth and elevation segments are not equal, the segment (either the azimuth or elevation) that has a smaller block index is selected and the corresponding segment of the other (azimuth or elevation) angle is selected with the same block index and which has the largest number of angles for this block index, and the average angle of this corresponding segment is determined. Here even though both the azimuth and elevation segments do not have largest number of estimated angles, at least one of them has the largest number of angles and this procedure results in a valid time index with less implementation complexity.

Figure 12:
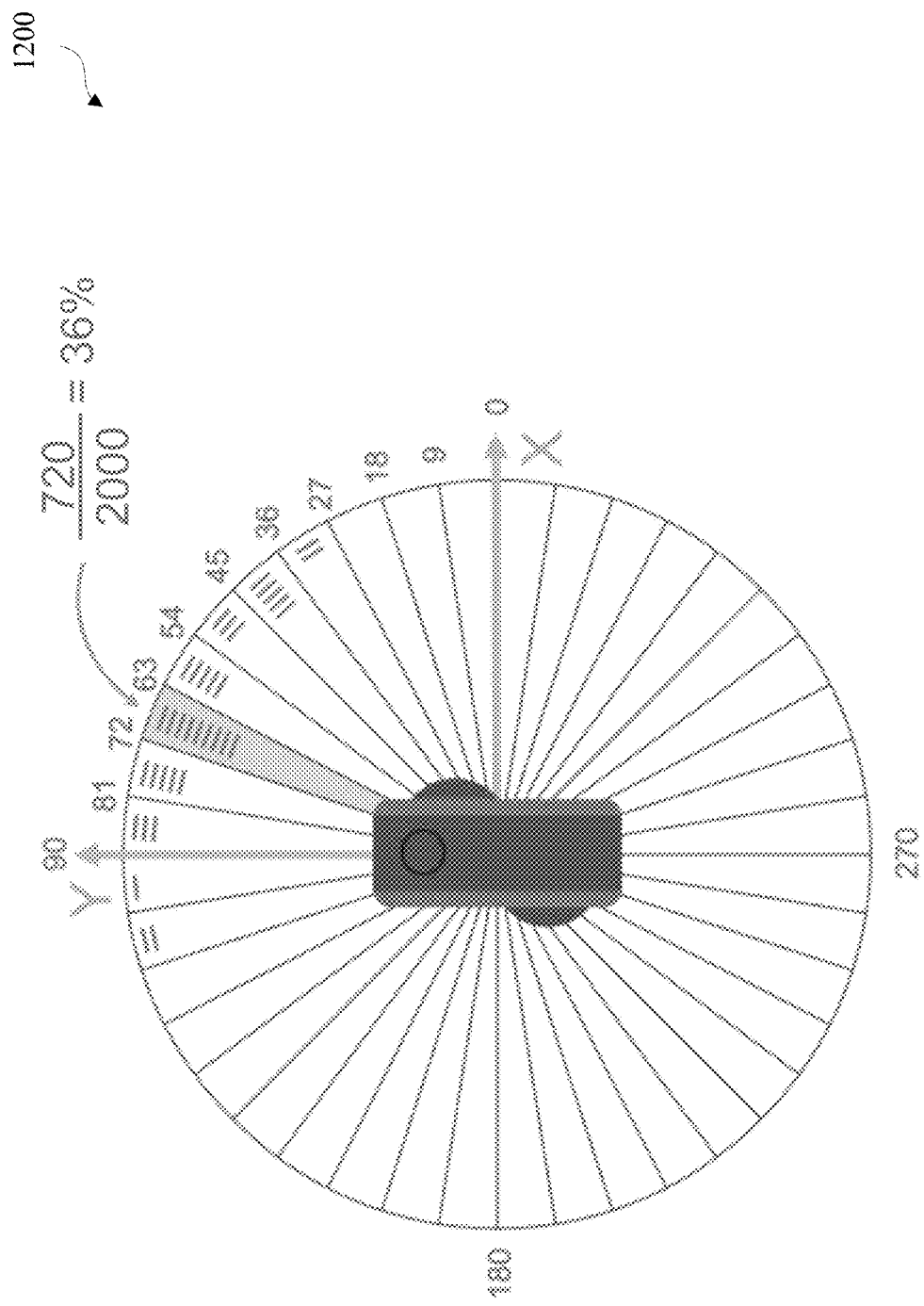
FIG. 12 is a diagram with a confidence level in accordance with embodiments of this disclosure.

In implementations, a confidence level may be computed for the DOAA azimuth angle estimation and another confidence level may be computed for the DOAA elevation angle estimation. An azimuth angle estimation confidence level may be determined by computing a ratio of the number of azimuth angle estimations in the selected azimuth segment and the total number of azimuth angle estimations collected in all of the azimuth segments for the given interval of time. Similarly, an elevation angle estimation confidence level may be determined by computing a ratio of the number of elevation angle estimations in the selected elevation segment and the total number of elevation angle estimations collected in all of the elevation segments. Confidence may be deemed high if a large percentage of the angles are in the selected segment. In implementations, the confidence level may be presented as a numeric value between 0-100. FIG. 12 is a diagram 1200 with a confidence level in accordance with embodiments of this disclosure.

If azimuth angle estimations and elevation angle estimations have not been computed for the defined number of error-free blocks, then the last or previously determined and reported DOAA azimuth angle estimation and the DOAA elevation angle estimation are reported with a confidence level of zero (0).

The methods and techniques for determining a direction of audio arrival from Ambisonics channels using azimuth and elevation segments as described herein, or aspects thereof, may be implemented by an image capture apparatus, or one or more components thereof, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, the image capture apparatus 500 shown in FIG. 5, the image capture apparatus 600 shown in FIGS. 6A-C, or combinations thereof. The methods and techniques for determining a direction of audio arrival from Ambisonics channels using azimuth and elevation segments as described herein, or aspects thereof, may be implemented by an image capture device, such as the image capture device 104 shown in FIGS. 1A-1B, one or more of the image capture devices 204, 206 shown in FIGS. 2A-2B, one or more of the image capture devices 304, 306 shown in FIG. 3, the image capture device 404 shown in FIGS. 4A-4B, or an image capture device of the image capture apparatus 500 shown in FIG. 5.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
generating multiple blocks of samples from Ambisonics signals for a time interval;
determining an azimuth angle estimate and an elevation angle estimate for the time interval when a defined number of blocks in the multiple blocks of samples are valid;
generating the azimuth angle estimate based on maximum number of azimuth angle estimates present in an azimuth segment amongst a defined number of azimuth segments;
generating the elevation angle estimate based on maximum number of elevation angle estimates present in an elevation segment amongst a defined number of elevation segments;
determining, for the azimuth angle estimate, an azimuth angle estimation confidence level based on a ratio of the maximum number of azimuth angle estimates present in the azimuth segment and a total number of azimuth angle estimates present in the defined number of azimuth segments; and
determining, for the elevation angle estimation, an elevation angle estimation confidence level based on a ratio of the maximum number of elevation angle estimates present in the elevation segment and a total number of elevation angle estimates present in the defined number of elevation segments,
wherein a direction of arrival of the Ambisonics signals is based on the azimuth angle estimate and the elevation angle estimate.

2. The method of claim 1, further comprising:
transforming, for a block of samples, at least the block of samples into a defined number of frequency domain bins; and
performing, in a subset of the defined number of frequency domain bins, a spectral analysis to determine whether the block of samples is valid.

3. The method of claim 2, wherein a frequency domain bin has a spectral value which is representative of an energy level in the frequency domain bin.

4. The method of claim 3, wherein the performing is further comprising:
designating the block of samples as valid if, for a W channel in the Ambisonics signals, a total energy across the subset of the defined number of frequency domain bins exceeds a defined active signal threshold.

5. The method of claim 4, wherein the performing is further comprising:
determining, for an X channel in the Ambisonics signals, an X signal threshold based on an X channel energy contribution to a W channel energy;
determining, for a Y channel in the Ambisonics signals, a Y signal threshold based on an Y channel energy contribution to the W channel energy;
determining, for a Z channel in the Ambisonics signals, a Z signal threshold based on an Z channel energy contribution to the W channel energy; and
designating a frequency domain bin in the subset of the defined number of frequency domain bins as a key frequency domain bin if at least one of an X channel energy value exceeds the X signal threshold, a Y channel energy value exceeds the Y signal threshold, or a Z channel energy value exceeds the Z signal threshold.

6. The method of claim 1, further comprising:
transforming a block of samples into a defined number of frequency domain bins; and
designating the block of samples as valid if, for a W channel in the Ambisonics signals, a total energy across a subset of the defined number of frequency domain bins exceeds a defined active signal threshold.

7. The method of claim 1, wherein the defined number of azimuth segments defines a 360° azimuth space.

8. The method of claim 7, wherein the defined number of elevation segments defines an elevation space between +90° to −90°.

9. The method of claim 1, further comprising:
applying rotation parameters to the Ambisonics signals prior to the determining the azimuth angle estimate and the elevation angle estimate when the method is performed separately or remote from an image capture device.

10. An image capture device, comprising:
a plurality of microphones; and
a processor configured to receive Ambisonics signals for a time interval from the plurality of microphones, wherein the processor is further configured to:
divide the time interval into a plurality of blocks;
determine an azimuth angle estimate and an elevation angle estimate for the time interval when a subset of blocks in the plurality of blocks are valid;
identify the azimuth angle estimate based on a maximum number of azimuth angle estimates present in an azimuth segment from a plurality of azimuth segments;
identify the elevation angle estimate based on a maximum number of elevation angle estimates present in an elevation segment from a plurality of elevation segments;
report, for the azimuth angle estimate, an azimuth angle estimate confidence level based on a ratio of the maximum number of azimuth angle estimates present in the azimuth segment and a total number of azimuth angle estimates present in the plurality of azimuth segments; and
report, for the elevation angle estimate, an elevation angle estimate confidence level based on a ratio of the maximum number of elevation angle estimates present in the elevation segment and a total number of elevation angle estimates present in the plurality of elevation segments,
wherein a direction of arrival of the Ambisonics signals is based on the azimuth angle estimate and the elevation angle estimate.

11. The image capture device of claim 10, wherein the processor is further configured to:
generate a plurality of frequency domain bins from a block; and
determine whether the block is valid by performing an energy analysis in a subset of the plurality of frequency domain bins.

12. The image capture device of claim 11, wherein the processor is further configured to:
determine that the block is valid if, for a W channel in the Ambisonics signals, a total energy across the subset of the plurality of frequency domain bins exceeds an active signal threshold.

13. The image capture device of claim 11, wherein the processor is further configured to:
determine, for an X channel in the Ambisonics signals, an X signal threshold based on an X channel energy contribution to a W channel energy;
determine, for a Y channel in the Ambisonics signals, a Y signal threshold based on an Y channel energy contribution to the W channel energy;
determine, for a Z channel in the Ambisonics signals, a Z signal threshold based on an Z channel energy contribution to the W channel energy; and
designate a frequency domain bin in the subset of the plurality of frequency domain bins as a key frequency domain bin if at least one of an X channel energy value exceeds the X signal threshold, a Y channel energy value exceeds the Y signal threshold, or a Z channel energy value exceeds the Z signal threshold.

14. The image capture device of claim 11, wherein the processor is further configured to:
generate a plurality of frequency domain bins from a block; and
determine that the block is valid if, for a W channel in the Ambisonics signals, a total energy across a subset of the plurality of frequency domain bins exceeds an active signal threshold.

15. The image capture device of claim 11, wherein the plurality of azimuth segments defines a 360° azimuth space.

16. The image capture device of claim 11, wherein the plurality of elevation segments defines an elevation space between +90° to −90°.

17. The image capture device of claim 11, wherein the processor is further configured to:
forego application of rotation parameters to the Ambisonics signals prior to determination of the azimuth angle estimate and the elevation angle estimate when processing is performed on the image capture device.

18. A method comprising:
determining a direction of arrival of Ambisonics signals for a time interval when a defined number of blocks in the time interval are valid, wherein the determining is further comprising:
determining an azimuth angle estimate and an elevation angle estimate for the time interval;
generating the azimuth angle estimate based on a maximum number of azimuth angle estimates present in an azimuth segment from a number of azimuth segments defining an azimuth space;

generating the elevation angle estimate based a maximum number of elevation angle estimate present in an elevation segment from a number of elevation segments defining an elevation space;

determining, for the azimuth angle estimate, an azimuth angle estimate confidence level based on a ratio of the maximum number of azimuth angle estimates present in the azimuth segment and a total number of azimuth angle estimates present in the number of azimuth segments; and determining, for the elevation angle estimate, an elevation angle estimate confidence level based on a ratio between the maximum number of elevation angle estimates present in the elevation segment and a total number of elevation angle estimates present in the number of elevation segments, wherein the direction of arrival is represented by the azimuth angle estimate and the elevation angle estimate.

19. The method of claim 18, wherein the determining the azimuth angle estimate and the elevation angle estimate for the time interval is further comprising:

performing, in a subset of frequency domain bins from a number of frequency domain bins generated from a block of the defined number of blocks, an energy analysis to determine whether the block is valid.

20. The method of claim 19, wherein a frequency domain bin has a spectral value which is representative of an energy level in the frequency domain bin.

\* \* \* \* \*